United States Patent [19]

Salisbury

[11] 4,102,833
[45] Jul. 25, 1978

[54] COLD IMPACT RESISTANT URETHANE FOAM

[75] Inventor: Wayne C. Salisbury, Middleton, N.H.

[73] Assignee: McCord Corporation, Detroit, Mich.

[21] Appl. No.: 778,001

[22] Filed: Mar. 16, 1977

Related U.S. Application Data

[63] Continuation-in-part of Ser. No. 642,559, Dec. 19, 1975, Pat. No. 4,048,105.

[51] Int. Cl.$^2$ .............................................. C08J 9/00
[52] U.S. Cl. ..................................... 521/159; 264/41; 521/176
[58] Field of Search ................... 260/2.5 AM, 2.5 AP, 260/77.5 AM

[56] References Cited

U.S. PATENT DOCUMENTS

| | | | |
|---|---|---|---|
| 3,728,288 | 4/1973 | Cobbs et al. | 260/2.5 AP |
| 3,892,691 | 7/1975 | White et al. | 260/2.5 AP |

Primary Examiner—Lewis T. Jacobs

Attorney, Agent, or Firm—McGlynn and Milton

[57] ABSTRACT

A quasi-prepolymer-type urethane foam for a reaction injection molding (RIM) system comprises, for the polyol side, a blend of a long-chain polyol with a short-chain diol and/or triol and an organometallic catalyst and, for the prepolymer side, a unique high—27 to 31%—free NCO quasi-prepolymer made by reacting an essentially pure MDI with a selected low molecular weight (240 to 1500) polyol having a functionality of about 2.7 to 3.3. The selected low molecular weight polyol is specifically a polyether polyol (i.e. a polyoxypropylene and/or ethylene polyol) initiated with TMP, hexanetriol, glycerine or other suitable polyol. The quasi-prepolymer, while having the expected high reactivity, surprisingly gives good rapid cures in less than 2 minutes. The resulting urethane foam is characterized by its excellent low temperature properties, especially −20% F cold flexibility and −20% F dart impact. The quasi-prepolymer storage stability can be greatly improved by the inclusion of a small amount of a liquid MDI.

8 Claims, No Drawings

COLD IMPACT RESISTANT URETHANE FOAM

RELATED APPLICATION

This application is a continuation-in-part of "High Density Urethane Foam for RIM", Ser. No. 642,559, filed Dec. 19, 1975, now U.S. Pat. Ser. No. 4,048,105, Sept. 13, 1977, by the present inventor. This earlier application is concerned particularly with a particular polyol blend to be used with the quasi-prepolymer described in the present application.

This invention pertains to the manufacture of urethane foam automobile trim components such as bumpers and fascia by reaction injection molding (RIM) of a particular quasi-prepolymer urethane foam composition. It is more particularly concerned with a quasi-prepolymer urethane foam composition that produces a foam product having excellent low temperature flexibility and impact properties.

This urethane foam is characterized by the use of unique prepolymer made with methylene bis (4-phenyl isocyanate), or MDI, and relatively low molecular weight polyols having a functionality of 2.6 to 3.3, especially 2.7 to 3.1. The quasi-prepolymer has an exceptionally high free isocyanate (free NCO) content—27 to 31%.

The quasi-prepolymer when prepared is a liquid and is reasonably storage stable. This is in part because, while the prepolymer is largely prepared from essentially pure MDI, a small amount of a "liquid" or a modified MDI is added towards the end of the reaction to disrupt the symmetry of the final prepolymer. The so-called "liquid" MDI contains a small amount of materials such as trimers and carbodiimides and these impurities inhibit crystallization.

The development of RIM systems such as ones using high pressure multi-stream high velocity impingement to effect essentially instantaneous mixing of urethane foam ingredients is a recent advance in the art. As used herein, RIM means a system wherein the theoretical time from initial mixing of any one portion of the urethane foam ingredients to injection in the mold cavity is less than 0.1 second.

Up to now quasi-prepolymer formulations with a free NCO of more than 26% have been difficult to cure at all, aside from the difficulty of making such a system meeting the constraints of RIM. As one skilled in the art appreciates, while a prepolymer having a high free NCO is highly reactive, the cure of the foam produced therewith is quite slow and often poor. Even in the catalyzed system cure times with a high free NCO prepolymer can be as much as 30 minutes. The free NCO of pure MDI is 33.6% and in the present invention the free NCO of the prepolymer is 27 to 31%, which indicates that a considerable amount of the isocyanate groups of the MDI remain unreacted and that the prepolymer contains only a relatively small (but significant) amount of the prepolymer polyol (preferably triol or triol/diol blend) referred to as LMW polyol. Usually 80 to 90 parts by weight of the MDI is admixed with 3 to 20 parts of the LMW polyol, and the mixture is allowed to exotherm at an elevated temperature with agitation and under an inert atmosphere. The temperature is kept preferably in the range of 120° to 170° F with cooling if necessary.

One of the unique features of this invention is that the high free NCO, highly reactive prepolymer does not suffer from poor cures and cure times. Cure times are under 2 minutes, usually 1 minute or less. This balance of reactivity versus cure is secured by using just enough but a minimal amount of the LMW polyol. The effectiveness of the cure can readily be determined from this simple laboratory bending test: a 0.125 inch thick sample plaque is rapidly folded back on itself immediately after demolding and any cracking and/or crazing is observed. The cure is considered to be satisfactory when no cracking or crazing appears.

The use of a triol as opposed to a diol in the prepolymer may at first blush seen questionable when one has gone to considerable expense to start with pure MDI to secure difunctionality. Pure MDI is some 2½ times as expensive as the higher functional polymeric MDI. Crude MDI has a different molecular structure with up to three reactive sites on a molecule. But it is a finding of this invention that just enough triol can be used to increase functionality above 2 and to dramatically reduce the cure time without serious loss of the important physical properties in the final foam—tear strength and elongation. While there is or may be some slight decrease in the final physical properties of the urethane foam, this is more than offset by the dramatic reduction in the foam cure time required to develop these physical properties.

With the foam of this invention, one set of physical properties of particular concern is measured by the Ford Cold Flexibility Test (ESB-M2P-105-A, Sec. 3.2.11) wherein a cold (−20° F) painted specimen is quickly bent 180° around a ½-inch mandrel. The paint used is specifically PPG Industries, Inc. (One Gateway Center, Pittsburgh, Pennsylvania 15222) Durethane D-100 that bonds well to urethane surfaces. In this test the paint film cracks and with many urethane foams these cracks in the paint film are propagated into the foam body, which is considered a failure. The present foam passes this test, i.e. cracks will not appear in the body of the foam.

The free NCO number sets or specifies the amount of triol that is present in the prepolymer. This triol is referred to in the claims as "low molecular weight" (LMW) polyol which means a polyol having a molecular weight in the range of 240 to 1500, a functionality in the range of 2.6 to 3.3 and specifically made from a polyether polyol (i.e. a polyoxypropylene/ethylene polyol) initiated with trimethyl propane (TMP), glycerine, hexanetriol or like diol or triol. A LMW polyol of too low a molecular weight causes prepolymer gelatin problems. Too high of a molecular weight impedes the cure of the final polymer.

The present quasi-prepolymer is also unique in that, despite its high free NCO, it is reasonably storage stable. By this is meant that while it probably is not safely shippable it can be stored for weeks in a plant at temperatures of about 90° F to about 120° F. The use of some liquid MDI from 1 to 20% by weight of the prepolymer helps in this regard in that it tends to disrupt crystallization. Storage of a prepolymer of this type at room temperature and at temperatures above 120° F favors dimer formation. The amount that forms is, of course, also dependent on the time in storage. However, storage in the optimum temperature range of about 90° to 110° F gives the longest storage time with minimal dimerization.

To secure acceptable foam properties, the polyol side of the urethane foam system preferably uses as a polymer backbone a polyol that is relatively long-chained, i.e. it has a molecular weight in the range preferably of 3000 to 6000, a functionality of 2 to 3 and an equivalent weight of 1500 to 3000. It is typically capped with ethylene oxide to have a high level of primary hydroxyl groups.

Other recognized ingredients can be used in the polyol blend such as alkylene diol/triols, crosslinkers/extenders, organometallic and amine catalysts, carbon black, blowing agents and the like to tailor specific properties into the RIM foam systems.

The following proportions can be used in the polyol blend:

|  | Parts by Weight |
|---|---|
| Long chain polyol | 50 to 100 |
| Aromatic and/or aliphatic polyamine | 0 to 10 |
| Alkane diol and/or triol | 0 to 25 |
| Alkylene amine catalyst | 0.01 to 3.0 |
| Organometallic catalyst | 0.01 to 0.15 |

The alkaline diols and triols can have molecular weight in the range of 62 to 250. Examples of such crosslinkers/extenders are diethylene glycol, pentane diol, trimethylol propane, and 1, 2, 6 hexane triol.

Examples of suitable known amine catalysts are: N-ethylmorpholine and TMBDA (tetramethylbutane diamine).

Examples of suitable known organometallic catalysts are dibutyl tin dilaurate and diacetate, stannous octoate and tin mercaptides.

Blowing agents that can be used include: methylene chloride, nitrogen, and DuPont's Freon 11 and Freon 12. Water can be used but may give rise to post blowing and paintability problems.

The foam formulations based on the quasi-prepolymer of this invention are so extremely reactive as not to be processable in conventional equipment. Commercially available equipment that can be used to process the present compositions include: Krauss-Maffei-164 PU40/PU80 (Standard Tool and Manufacturing Co., 237 Laurel Avenue, Kearny, New Jersey 07032), Cannon H-100-2 (International Industrial Equipment Corporation, 438 Allegheny River Boulevard, Oakmont, Pa. 15139) and Henneke HK-1000 and KK-5000 (Mobay Chemical Company, Pittsburgh, Pa. 15205).

Usually in the range of 0.6 to 0.7 parts by weight of the prepolymer of this invention will be admixed with each part by weight of the polyol blend.

Being so highly reactive the foam systems of this invention dramatically reduce mold-occupancy times. For normal systems in-mold cure times may be as much as two to three minutes whereas with this invention times under 100 seconds are easily obtainable and times under 50 seconds to demolding are the usual rule. Molded densities are preferably in the range of 45 to 72, preferably 55 to 65 pounds per cubic foot.

EXAMPLES

The following blend was prepared and used in all of the examples, being referred to hereafter as the "Polyol Blend":

|  | Parts by weight |
|---|---|
| Polyether polyol (1) | 84.92 |
| BDO (2) | 16.13 |
| Ethylene glycol | 0.93 |
| Catalyst (3) | 1.20 |
| DBTDL (4) | 0.02 |
|  | 102.50 |

(1) Mobay Chemical Company 3 s (Pittsburgh, Pennsylvania 15205) E-9207. It has a molecular weight of 4,000 and a functionality of 2.3. This polyol is a polyoxypropylene polyol within the range of 80 to 90 percent primary hydroxy groups, which are more reactive than secondary hydroxy groups. Other such polyols having a molecular weight in the range of 3000 to 6000, a functionality in the range of 2 to 3 and an equivalent weight in the range of 1500 to 3000 can be used. These include such high molecular weight diols, triols and blends as Jefferson Chemical Company, Inc.'s (260 Madison Avenue, New York, New York) 6500; Union Carbide Corporation's (South Charleston, West Virginia 25303) NIAX 3128; BASF Wyandotte Corporation's (Wyandotte, Michigan 48192) P-380; Olin Chemicals Division's (275 Winchester Avenue, New Haven, Connecticut) Poly GX-442; and Dow Chemical Company's (Freeport, Texas 77541) 4701.
(2) 1, 4 butane diol.
(3) 33% triethylene diamine in dipropylene glycol.
(4) Dibutyl tin dilaurate.

EXAMPLE 1 — THE EFFECT OF PREPOLYMER FREE NCO

Urethane samples in the form of 0.125 thich plaques were prepared from the Polyol Blend and various prepolymers using in all cases an isocyanate index (ratio of free NCO groups to available -OH groups or equivalent) of 105% in the reaction mixture. In practice, the Index used can be in the range of 98 to 108.

The prepolymer was made by reacting the MDI and polyol at about 150° F for 55-60 minutes under constant agitation and a nitrogen blanket. The 260 molecular weight triol was Dow Chemical Company's (Freeport, Texas) Voranol 2025. MDI [methylene bis (4-phenyl isocyanate)] used in the example was Mobay's Multathene MM, 99.6%+ pure. Upjohn's Isonate 125M could also be used. The prepolymer was allowed to cool to 110° F which is its optimum storage temperature.

The Polyol Blend and the prepolymer were mixed by hand addition to a high-speed mixer and blended for 5 to 10 seconds. The blend was then quickly poured onto an aluminum mold (heated to 140°-150° F), the mold was clamped and the foam was cured for 2 minutes.

The plaque was quickly demolded and bent back 180°, as previously described, to determine the state of cure. Cracking of substrate at 2 minutes is considered a failure. A slight crazing or change in transparency is considered marginal. A good cure does not crack or craze in 2 minutes.

The Chevrolet heat sag test is a cantilever test. A 1 × 5-inch sample is suspended with a 4-inch overhang in a hot air oven at 250° F for 1 hour. The sag is the change in height measured after the sample has been cooled to ambient temperature. Less than a 1-inch sag is desired.

Blowing agents may be used with any of these formulations but were not used as they make hand mixing of these extremely reactive polymers more difficult.

The Polyol Blend (102.57 grams) was mixed at 110° F with 103.7 grams of a 20% free NCO prepolymer prepared from pure MDI and a 260 molecular weight triol. The polymer produced, its mechanical, impact and cure properties, are set forth in Table I, Example I-A.

Similarly, Samples I-B through I-E were prepared. The dramatic improvement in the temperature performance of the urethane at prepolymer FNCO's of 27 and above is to be noted.

Table I

| | Effect of Prepolymer free NCO (105% Isocyanate Index) | | | | |
|---|---|---|---|---|---|
| Prepolymer Blend | I-A | I-B | I-C | I-D | I-E |
| Pure MDI | 45.0 | 60.5 | 103.3 | 198.0 | 100.0 |

Table II

| | Effects of Polymer Polyol Functionality (f) (105% Isocyanate Index) | | | | | | | |
|---|---|---|---|---|---|---|---|---|
| | II-A | II-B | II-C | II-D | II-E | II-F | II-G | II-H |
| Polyol Blend (PBW) | 102.57 | 102.57 | 102.57 | 102.57 | 102.57 | 102.57 | 102.57 | 102.57 |
| Prepolymer Blend | 66.2 | 66.2 | 66.2 | 66.2 | 66.2 | 73.2 | 87.2 | 103.7 |
| Free NCO | 30% | 30% | 30% | 30% | 30% | 27.0% | 23% | 20% |
| Pure MDI | 215.9 | 210.8 | 207.4 | 204.0 | 206.6 | 113.2 | 66.7 | 49.8 |
| TPG | 10.0 | 7.0 | 5.0 | 3.0 | — | 10.0 | 10.0 | 10.0 |
| 260 M. Wt. Triol | — | 3.0 | 5.0 | 7.0 | 10 | — | — | — |
| Avg. Functionality | 2.0f | 2.3f | 2.5f | 2.7f | 3.0f | 2.0f | 2.0f | 2.0f |
| Physical Properties | | | | | | | | |
| Cure at 2 minutes | Failed | Failed | Failed | Fair | Passed | Marginal | Passed | Passed |
| Cold Flex −20° F | Passed | Passed | Passed | Passed | Passed | Failed | Failed | Failed |
| Tensile | 1,270 | 1,340 | 1,510 | 1,540 | 1,590 | 1,670 | 2,150 | 2,130 |
| Elongation | 260% | 180% | 240% | 220% | 220% | 310% | 240% | 190% |
| Tear | 311 | 356 | 320 | 324 | 315 | 388 | 396 | 445 |
| Flex Modulus, RT | 12,200 | 11,700 | 11,500 | 12,700 | 10,100 | 14,700 | 14,400 | 26,600 |
| Specific Gravity | 0.87 | 0.95 | 0.90 | 0.93 | 0.95 | 1.04 | 0.96 | 0.91 |
| Chevrolet Sag, 250° F, 1 Hr | 1.5 | 1.0 | 0.95 | 0.71 | 0.57 | 2.6 | 1.6 | 1.4 |

Table I-continued

| | Effect of Prepolymer free NCO (105% Isocyanate Index) | | | | |
|---|---|---|---|---|---|
| Prepolymer Blend | I-A | I-B | I-C | I-D | I-E |
| 260 M. Wt. Triol | 10.0 | 10.0 | 10.0 | 10.0 | 0 |
| Prepolymer FNCO | 20% | 23% | 27% | 30% | 33.6% |
| Reaction Mixture | | | | | |
| Polyol Blend | 102.57 | 102.57 | 102.57 | 102.57 | 102.57 |
| Prepolymer Blend | 103.70 | 87.20 | 73.20 | 66.20 | 58.80 |
| Cure at 2 Mins. | Excellent | Excellent | Excellent | Excellent | 30 Mins |
| Physical Properties | | | | | |
| Tensile | 2,730 | 1,890 | 1,790 | 1,560 | 1,430 |
| Elongation | 80% | 93% | 140% | 130% | 170% |
| Tear | 454 | 354 | 314 | 300 | 350 |
| Flex Modulus, RT | 85,700 | 49,200 | 22,400 | 13,500 | 14,200 |
| Specific Gravity | 1.12 | 103 | 0.995 | 0.101 | 1.01 |
| Chevy Sag, 250° F, 1 Hr | 1.8 | 1.6 | 0.79 | 0.62 | 0.69 |
| Cold Flex, −20° F | Failed | Failed | Passed | Passed | Passed |

CONCLUSIONS — EXAMPLE I

Example I demonstrates:

(a) As free NCO is increased, the temperature performance (both high and low) improves. Free NCO's of 27% and above pass the test.

(b) The cure is acceptable except with the pure MDI. Pure MDI is, obviously, no longer a prepolymer system.

(c) The mechanical properties of polymers Examples I-C and I-D are close to those of I-E which is the MDI one-shot that could not be cured. Example I-D showed the best temperature performance.

EXAMPLE 2 — EFFECT OF POLYOL FUNCTIONALITY IN PREPOLYMER

Tripropylene glycol, the Voranol 2025 and blends thereof to yield average functionalities (f) of 2.3, 2.5, and 2.7 were used to prepare the prepolymer. Molded plaques were prepared from the Polyol Blend as in the previous example. BASF Wyandotte Corporation's TP-340 and Union Carbide's LG-650 could also be used from the LMW Polyol.

The Polyol Blend (102.57 grams) was reacted with 66.2 grams of prepolymer made by reacting 215.9 grams of pure MDI with 10 grams of tripropylene glycol (functionality 2.0) using the previously mentioned prepolymer reaction conditions. The polymer formulation and its properties are listed in Table II as Example II-A. Note the poor cure.

Similarly Examples II-B through II-H were prepared and evaluated.

CONCLUSIONS — EXAMPLE II (a) The most dramatic effect of polyol functionality is on cure. As the functionality increases the cure, as measured by the previously described test, becomes better. Marginal cures are seen at 2.7f and 3.0f yields excellent cure. Below 2.6f the cure is unacceptable and somewhat above 3.1f the mechanical properties would deteriorate.

(b) The high temperature performance, i.e. sag, is improved dramatically with increase in functionality.

(c) Low temperature impact is improved as the functionality is increased.

A functionality of 3.0 at a 27% free NCO passes the cold flex test; a functionality of 2.0 at a 27% free NCO does not.

EXAMPLE III — EFFECT OF PREPOLYMER POLYOL MOLECULAR WEIGHT

The molecular weight of the triol used in prepolymer were varied from 260 to 6500, while keeping the prepolymer free NCO at 30%. The 6500 molecular weight material was Jefferson Chemical's SF 6501 and the 260 molecular weight material was Voranol 2025. The other polyols were also commercially available materials of the molecular weight specified.

The Polyol Blend (102.57 grams) was reacted with 66.2 grams of a 30% FNCO prepolymer made by reacting 6.3 grams of a 6500 molecular weight triol and 58.3 grams of pure MDI. The resulting polymer would not cure in 5 minutes. See Table III, Example A.

Additional Examples III-B through III-G were prepared and evaluated as set out in Table III.

Table III

| Effect of Triol Molecular Weight on State of Cure (105% Isocyanate Index) | |
|---|---|
| Polyols Mol. Wgt. | Cure Time |
| A − 6500 | 5 mins. + |
| B − 4500 | 5 mins. + |
| C − 3000 | 5 mins. + |
| D − 1600 | 3.5 mins. |
| E − 500 | 2 mins. Excellent |
| F − 340 | 2 mins. Excellent |
| G − 260 | 2 mins. Excellent |

The mechanical and impact properties of the various polymers were about the same because of the small concentration of triol in the total formulation.

CONCLUSION — EXAMPLE III (a) The molecular weight of the polyol used to make the prepolymer has a definite effect on the cure rate of the resulting polymer.
(b) The upper limit of triol molecular weight is from 500 (preferred) to 1,500 for acceptable cures.

EXAMPLE IV — EFFECT OF LIQUID MDI LEVEL

The amount of the liquid or modified MDI was varied from 0 to 100%. Upjohn's Isonate 143D was used in this example. The purpose of this material is to maintain the prepolymer liquid under storage conditions. The MDI contains a small amount of some trimers and carbodiimides which disrupt the symmetry of the final prepolymer molecules and help keep the mixture liquid, which is a convenience. Mobay's Mondur CD could also be used.

The Polyol Blend (102.57 grams) was reacted with 62.9 grams of a prepolymer containing 10% liquid MDI and 90% of a 30% free NCO MDI/triol prepolymer. The liquid MDI was merely blended as the final step in the prepolymer reaction. It can, however, be added at any point during the reaction or any time after. Example IV-B shows the mechanical, impact and cure properties of this formulation Similarly, Examples IV-A and IV-C through IV-F were prepared.

Table IV
Effect of Liquid MDI Level (105% Isocyanate Index)

|  | IV-A | IV-B | IV-C | IV-D | IV-E | IV-F |
|---|---|---|---|---|---|---|
| Polymer Blend PBW | 66.2 | 62.9 | 63.4 | 63.8 | 64.1 | 64.7 |
| 30% Free NCO MDI/Triol Prepolymer | 100 | 90 | 70 | 50 | 30 | 0 |
| Liquid MDI | 0 | 10 | 30 | 50 | 70 | 100 |
| Cure | Pass 2 min. | Pass 2 min. | Pass 2 min. | Pass 2 min. | Pass 2 min. | Pass 2 min. |
| Physical Properties |  |  |  |  |  |  |
| Tensile | 1,590 | 1,570 | 1,560 | 1,560 | 1,490 | 1,570 |
| Elongation | 220% | 190% | 180% | 200% | 200% | 180% |
| Tear | 315 | 311 | 312 | 297 | 290 | 315 |
| Flex Modulus, RT | 10,100 | 11,400 | 10,800 | 9,600 | 10,800 | 10,100 |
| Specific Gravity | 0.95 | 0.95 | 0.95 | 0.88 | 0.88 | 0.92 |
| Chevrolet Sag, 250° F 1 Hr. | 0.56 | 0.57 | 0.66 | 0.63 | 0.72 | 0.81 |
| Cold Flex, −20° F | Passed | Passed | Passed | Passed | Passed | Passed |

CONCLUSIONS — EXAMPLE IV (a) The high temperature performance as measured by the sag test degrades with increases in the concentration of liquid MDI. Levels of more than 50% liquid MDI result in a significant increase in sag. Also, liquid MDI is inherently more expensive than the triol prepolymer of MDI. Other mechanical, impact and cure properties remain about the same.

(b) A level of about 10% liquid MDI gave adequate storage stability with minimum effect on high temperature performance.

EXAMPLE V — AUTOMOBILE EXTERIOR TRIM COMPONENTS

A 1977 Firebird front fascia (part No. 542092) was molded using a foam of this invention and an HK-1000 foam machine with impingement mixing. The prepolymer used was the same as that of Example II-B. The polyol blend was just slightly modified from the Polyol Blend of the Examples. Three parts by weight of an aromatic amine, Upjohn's Curethane 103 (See U.S. Pat. No. 3,575,896 and 3,681,291) was added to the Polyol Blend along with 3 parts by weight of a blowing agent, trichlor trifluoro methane, duPont's Freon 11. The mix proportions were adjusted to keep the Index at 105.

The Index was 105%, the prepolymer temperature was 110° F, the polyol temperature was 90° F and the mold temperature was 140° F. The part, a very complex front fascia, was removed 60 seconds after completion of the shot. Shot time was in the order of 3 seconds.

The resulting foam article had a density of 62 pounds per cubic foot, had excellent temperature performance (0.6 Chevrolet sag), and passed the Ford Cold Flex at −20° F painted with PPG's D-100 white paint. No problems with the painting or paint adhesion were encountered nor was any fading or discoloration noted.

A second molding, a 1978 Camaro front bumper cover (part No. 356576) was also molded using the same formulation and similar processing conditions. The bumper passed the painted impact tests at both high and low temperatures and was in all other respects satisfactory.

What is claimed is:

1. A urethane foam quasi-prepolymer having a free isocyanate content in the range of 27 to 31% and consisting essentially of the reaction product of (parts by weight):

|  | Parts |
|---|---|
| Pure MDI | 80 to 90 |
| LMW Polyol | 3 to 20 | wherein said pure MDI is 99%+ methylene bis (4-phenyl isocyanate) and said LMW Polyol is selected from the group consisting of a polyether polyol and polyether polyol blends and has a molecular weight in the range of 240 to 1500 and a functionality in the range of 2.6 to 3.3 on the average for all polyol present, said quasi-prepolymer being made by blending together said pure MDI and LMW polyol and allowing the blend to react at an elevated temperature.

2. The quasi-prepolymer of claim 1 rendered storage stable when held at a temperature in the range of 90° to 120° F by the blending and reacting therein at any stage of the reaction of in the range of 1 to 20 percent by weight of a liquid MDI.

3. The quasi-prepolymer of claim 1 wherein said LMW polyol is selected from the group consisting of polyoxyethylene and polyoxypropylene polyols and said functionality is in the range of 2.7 to 3.1.

4. A urethane foam having good low temperature properties made by reacting at an Isocyanate Index in the range of 98 to 108 of the quasi-prepolymer of claim 1 with a polyol blend of the following composition:

|  | Parts by Weight |
|---|---|
| Long chain polyol | 50 to 100 |
| Alkane polyol | 0 to 25 |
| Alkylene amine catalyst | 0.01 to 3.0 |

| | Parts by Weight |
|---|---|
| Organometallic catalyst | 0.01 to 0.05 | wherein said long chain polyol has a molecular weight in the range of 3000 to 6000 and a functionality in the range of 2 to 3 and said alkane polyol has a molecular weight in the range of 62 to 250.

5. The foam of claim 4 wherein in the range of 0.6 to 0.7 parts of said quasi-prepolymer are reacted with each part by weight of said polyol blend.

6. A urethane foam article made with the urethane foam of claim 4 when made in a RIM system to a molded density in the range of 55 to 65 pounds per cubic foot with a demolding time of less than 2 minutes.

7. A quasi-prepolymer urethane foam consisting of on the one hand a polyol blend and on the other a quasi-prepolymer, the two being admixed and reacted to form a foam:

(a) said polyol blend comprising:

| | Parts by Weight |
|---|---|
| Long chain polyol | 50 to 100 |
| Alkane polyol | 0 to 25 |
| Alkylene amine catalyst | 0.01 to 3.0 |
| Organometallic catalyst | 0.01 to 0.05 | wherein said long chain polyol has a molecular weight in the range of 3000 to 6000 and a functionality in the range of 2 to 3 and said alkane polyol has a molecular weight in the range of 62 to 250.

(b) said quasi-prepolymer having a free isocyanate content in the range of 27 to 31% and comprising the reaction product of:

| | Parts by Weight |
|---|---|
| Pure MDI | 80 to 90 |
| LMW Polyol | 3 to 20 | wherein said LMW Polyol is selected from the group consisting of a polyether polyol and polyether polyol blends having a molecular weight in the range of 240 to 1500 and a functionality in the range of 2.6 to 3.3 on the average for all polyol present.

8. A urethane foam made by bringing together the polyol blend and quasi-prepolymer of claim 7 in a RIM machine at an Isocyanate Index in the range of 98 to 108, injecting the resulting mixture into a closed cavity mold in an amount sized to give a foam density in the range of 45 to 72 pounds per cubic foot, allowing said mixture to react and demolding the foamed product in less than 2 minutes.

* * * * *